(12) United States Patent
Kim et al.

(10) Patent No.: US 9,078,244 B2
(45) Date of Patent: Jul. 7, 2015

(54) APPARATUS AND METHOD FOR PERFORMING HARQ RETRANSMISSION PROCESS TO RECEIVE E-MBS SERVICE IN A MULTI-CARRIER SYSTEM

(75) Inventors: Jeongki Kim, Anyang-si (KR); Kiseon Ryu, Anyang-si (KR); Youngsoo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 187 days.

(21) Appl. No.: 13/810,150
(22) PCT Filed: Feb. 16, 2011
(86) PCT No.: PCT/KR2011/001031
§ 371 (c)(1), (2), (4) Date: Jan. 14, 2013
(87) PCT Pub. No.: WO2012/020900
PCT Pub. Date: Feb. 16, 2012

(65) Prior Publication Data
US 2013/0136053 A1 May 30, 2013

Related U.S. Application Data

(60) Provisional application No. 61/373,244, filed on Aug. 12, 2010.

(30) Foreign Application Priority Data

Dec. 21, 2010 (KR) .................. 10-2010-0131885

(51) Int. Cl.
*H04W 72/04* (2009.01)
*H04L 1/18* (2006.01)
*H04L 5/00* (2006.01)
*H04L 27/26* (2006.01)
*H04W 4/06* (2009.01)
*H04W 36/06* (2009.01)

(52) U.S. Cl.
CPC ............. *H04W 72/04* (2013.01); *H04L 1/1812* (2013.01); *H04L 1/1887* (2013.01); *H04L 5/0044* (2013.01); *H04L 27/2626* (2013.01); *H04W 4/06* (2013.01); *H04W 36/06* (2013.01)

(58) Field of Classification Search
CPC .. H04B 7/2643; H04B 7/2656; G08B 25/016; H04J 1/00; H04J 1/04; H04J 1/06; H04J 1/14; H04J 1/18; H04J 1/045; H04J 1/065; H04L 1/0003; H04L 5/06; H04L 5/0007; H04L 5/12; H04L 5/023; H04L 5/0046; H04L 5/0048; H04L 12/44; H04L 12/185; H04L 12/189; H04L 12/403; H04L 12/2602; H04L 12/2697; H04L 12/2801; H04L 27/26; H04L 27/2602; H04L 27/2608; H04L 27/2647; H04L 27/2657; H04L 27/2662; H04L 29/06; H04L 29/06027; H04L 29/081084; H04L 47/10; H04L 5/044; H04L 12/18; H04L 12/64; H04L 47/806; H04L 27/2626; H04M 11/04; H04M 2242/04; H04M 2207/18; H04N 5/4401; H04Q 11/0478; G06Q 30/02; H04W 4/02; H04W 4/06; H04W 4/22; H04W 8/04; H04W 8/18; H04W 8/26; H04W 12/06; H04W 16/10; H04W 16/14; H04W 28/04; H04W 28/16; H04W 28/26; H04W 48/08; H04W 52/02; H04W 60/00; H04W 60/04; H04W 74/04; H04W 76/02; H04W 76/007; H04W 84/08; H04W 84/18; H04W 88/02; H04W 88/06; H04W 88/08; H04W 92/02; H04W 36/06; H04W 36/026
USPC ......... 370/242, 302, 312, 329, 341, 343, 347, 370/431, 437, 464, 480, 481; 455/414.1, 455/404.1, 404.2, 422.1, 435.1, 450, 458
See application file for complete search history.

(56) References Cited

U.S. PATENT DOCUMENTS

| | | | |
|---|---|---|---|
| 2009/0109890 A1* | 4/2009 | Chow et al. | 370/312 |
| 2009/0147740 A1* | 6/2009 | Kim et al. | 370/329 |
| 2010/0034126 A1 | 2/2010 | Kitazoe et al. | |
| 2010/0110879 A1 | 5/2010 | Kim et al. | |
| 2011/0002281 A1* | 1/2011 | Terry et al. | 370/329 |

* cited by examiner

FOREIGN PATENT DOCUMENTS

| | | |
|---|---|---|
| KR | 10-2005-0041344 A | 5/2005 |
| KR | 10-2010-0048870 A | 5/2010 |

*Primary Examiner* — Alpus H Hsu
*Assistant Examiner* — Dharmesh Patel
(74) *Attorney, Agent, or Firm* — Birch, Stewart, Kolasch & Birch, LLP

(57) ABSTRACT

Disclosed is a method for receiving E-MBS service by performing a carrier switching operation in a multi-carrier system, the method comprising: performing carrier switching from primary carrier to secondary carrier; checking whether the uplink HARQ retransmission process is performed when the carrier switching is performed; and terminating or suspending the performing uplink HARQ retransmission process if the uplink HARQ retransmission process is performed.

4 Claims, 4 Drawing Sheets

(a)

(b)

(a)

(b)

APPARATUS AND METHOD FOR PERFORMING HARQ RETRANSMISSION PROCESS TO RECEIVE E-MBS SERVICE IN A MULTI-CARRIER SYSTEM

CROSS REFERENCE TO RELATED APPLICATIONS

This application is the National Phase of PCT/KR2011/001031 filed on Feb. 16, 2011, which claims priority under 35 U.S.C. 119(e) to U.S. Provisional Application No. 61/373,244 filed on Aug. 12, 2010, and under 35 U.S.C 119(a) to Patent Application No. 10-2010-0131885 filed in the Republic of Korea on Dec. 21, 2010, all of which are hereby expressly incorporated by reference into the present application.

TECHNICAL FIELD

The present disclosure relates to a method and apparatus for performing a HARQ retransmission process in a multi-carrier system, and more particularly, to a method and apparatus for performing a HARQ retransmission process in a terminal performing a carrier switching operation.

BACKGROUND ART

Multi-Carrier In General

A multi-carrier system which will be described hereinafter illustrates a case where one or more individual carriers are bundled to be used. FIGS. 1A and 1B are views for describing a multi-band radio frequency-based signal transmission and reception method.

Technologies in which multiple carriers (for example, multiple frequency allocation (FA) bands) are managed by one medium access control (MAC) entity to effectively manage a multi-band (or multi-carrier) have been proposed.

In FIG. 1, one MAC layer at the transmission and reception ends can manage multiple carriers to effectively use a multi-carrier. At this time, in order to effectively transmit and receive a multi-carrier, it is assumed that both the transmission and reception ends can transmit and receive a multi-carrier. At this time, frequency carriers (FCs) managed by one MAC layer allows flexible resource management since they do not need to be contiguous.

In other words, the frequency carriers may have contiguous aggregation or non-contiguous aggregation.

In FIGS. 1A and 1B, PHY 0, PHY 1, . . . , PHY n-2, and PHY n-1 represent multiple bands according to this technology, and each band may have a frequency allocation (FA) size allocated for a specific service according to a predetermined frequency policy.

For example, PHY 0 (RF carrier 0) may have a frequency allocation size allocated for a general FM radio broadcast, and PHY 1 (RF carrier 1) may have a frequency allocation size allocated for cellular phone communication.

In this manner, each frequency band may have a different frequency allocation size depending on the characteristics thereof, but it is assumed in the following description that each frequency allocation (FA) has a size of A MHz for the sake of convenience of explanation.

Furthermore, each frequency allocation may be represented by a carrier frequency to use a baseband signal in each frequency band. Thus, in the following description, each frequency allocation will be referred to as a "carrier frequency band" or will be simply referred to as a "carrier" representing each carrier frequency band if it does not cause confusion.

Furthermore, as in the recent 3GPP LTE-A, the foregoing carrier may be referred to as a "component carrier" to discriminate it from a sub-carrier used in the multi-carrier scheme.

In this aspect, the foregoing "multi-band" scheme be may also referred to as a "multi-carrier" scheme or "carrier aggregation" scheme.

In order to transmit signals through multiple bands as illustrated in FIG. 1A and receive signals through multiple bands as illustrated in FIG. 1B, both the transmitter and receiver are required to include an RF module for transmitting and receiving signals through multiple bands. Furthermore, in FIG. 1, the configuration method of "MAC" is determined by a base station, regardless of downlink (DL) or uplink (UL).

For the sake of convenience of explanation, this technology is a scheme in which one MAC entity (hereinafter, simply referred to as a "MAC" unless if it does not cause confusion) manages and operates a plurality of radio frequency (RF) carriers to transmit and receive signals. Furthermore, the RF carriers managed by one MAC are not required to be contiguous. As a result, according to this technology, it has an advantage of flexibility in terms of resource management.

In an IEEE 802.16m system, which is one radio communication systems, the carrier type can be largely divided into two kinds of groups in the aspect of a base station. For example, it may be divided into a fully-configured carrier type (hereinafter, "FCCT"), and a partially-configured carrier type (hereinafter, "PCCT").

The fully-configured carrier type represents a carrier capable of transmitting and receiving both control information and data, and the partially-configured carrier type represents a carrier capable of only transmitting downlink (DL) data. At this time, the partially-configured carrier may be used for a service, such as an Enhanced Multicast Broadcast Service (E-MBS), mainly providing downlink (DL) data.

The carrier allocated in the aspect of a mobile terminal can be divided into two carrier types. For example, the carrier type may be divided into a primary carrier and secondary carriers. At this time, one primary carrier and a plurality of secondary carriers may be allocated to mobile terminals from a base station.

The primary carrier is selected from fully-configured carriers, and most main control information of a mobile terminal may be transmitted on a primary carrier. The secondary carrier may be selected from fully-configured or partially-configured carriers, and may be additionally allocated according to the mobile terminal or base station's request or instruction.

The mobile terminal may transmit and receive control information on a secondary carrier as well as all control information through a primary carrier, and the mobile terminal may transmit and/or receive data to and/or from the base station through a secondary carrier. At this time, the secondary carrier as a fully-configured carrier allocated to a specific mobile terminal may be configured as the primary carrier of another mobile terminal.

Multi-Carrier Switching

It refers to a multi-carrier mode in which a terminal switches its physical layer connection from a primary carrier to a partially-configured or fully-configured secondary carrier. Here, the carrier switching of a terminal is carried out by an instruction of the base station to receive an Enhanced Multicast and Broadcast Service (E-MBS) in a secondary carrier.

The terminal is connected to a secondary carrier for a specific period of time, and then the connection returns to a primary carrier. The terminal is not required to maintain its transmission or reception through a primary carrier while the terminal being connected to a secondary carrier for a specific period of time.

Basic Multi-Carrier (MC) Mode

Basic multi-carrier mode refers to a mode in which the terminal is operated with only one carrier. However, the terminal supports a primary carrier change process as well as an optimized scanning for carriers associated with the multi-carrier operation.

Carrier Switching Operation For E-MBS Services

E-MBS services are carried out by a specific carrier (secondary carrier), which is not a primary carrier of the terminal. An E-MBS terminal (a terminal being operated in a carrier switching mode) having only one transceiver in a state of being connected to the base station is switched from a primary carrier to another carrier to receive E-MBS data bursts, an E-MBS configuration message, and an E-MBS MAP, and performs carrier switching from the another carrier to the primary carrier to receive a unicast service from the base station.

The E-MBS terminal performs a carrier switching operation based on the terminal's E-MBS subscription information allocated from the base station to the terminal during a dynamic service addition (DSA) process. For example, the E-MBS subscription information may be MSTIDs+FIDs.

FIG. 2 is a view illustrating a method of performing a carrier switching operation for allowing the terminal to receive an E-MBS service when the terminal's carrier switching mode is activated in a multi-carrier system.

If the terminal's carrier switching mode is activated, then the terminal may receive a unicast service through a primary carrier during the unicast available interval.

The terminal may transmit uplink data to the base station through a primary carrier during the unicast available interval, and may perform an uplink HARQ retransmission process. The information on the unicast available interval may be transmitted by the base station.

Furthermore, the terminal may receive E-MBS data such as E-MBS contents, an E-MBS MAP, an E-MBS configuration message, and the like, from the base station through a secondary carrier in which an E-MBS service is transmitted during the remaining interval excluding the unicast available interval.

As illustrated in FIG. 2, if the unicast available interval is terminated, then the terminal performs carrier switching from a primary carrier to a secondary carrier to receive an E-MBS service through the secondary carrier during the E-MBS service interval. Furthermore, if the E-MBS service interval is terminated, then the terminal performs carrier switching from a secondary carrier to a primary carrier to receive a unicast service from the base station through the primary carrier.

UL HARQ Operation

In a 16 m system, an uplink HARQ process is synchronously operated in general. In other words, if the uplink HARQ process is operated, then resources for retransmission are allocated to LRUs such as previous HARQ subpacket transmission of one sub-frame subsequent to an indicated period (HARQ timing specified in the system).

The operation is applicable to a case where UL Basic Assignment A-MAP IE is not transmitted at the relevant timing, and resources for retransmission is allocated to LRUs indicated by the relevant UL Basic Assignment A-MAP IE if the UL Basic Assignment A-MAP IE is transmitted for HARQ retransmission. The resource allocation for retransmission to such one HARQ process is implemented until the maximum number of HARQ transmissions specified by a system is terminated.

DISCLOSURE OF INVENTION

Solution to Problem

The objective of the present disclosure is to provide a HARQ operation for uplink unicast services in a terminal performing a carrier switching operation to receive E-MBS services in a multi-carrier system.

According to the present disclosure, there is provided a method for receiving E-MBS service by performing a carrier switching operation in a multi-carrier system, the method comprising: performing carrier switching from primary carrier to secondary carrier; checking whether the uplink HARQ retransmission process is performed when the carrier switching is performed; and terminating or stopping(or suspending) the performing uplink HARQ retransmission process if the uplink HARQ retransmission process is performed.

Furthermore, it is characterized in that said terminating the uplink HARQ retransmission process terminates the uplink HARQ retransmission process when performing the carrier switching from the primary carrier to the secondary carrier even if uplink HARQ bursts corresponding to the uplink HARQ retransmission are not transmitted up to the maximum number of transmissions or not successfully decoded.

Furthermore, it is characterized in that the method may further include checking the number of uplink HARQ retransmissions being performed when performing the carrier switching to calculate the remaining number of uplink HARQ retransmissions; and checking whether the remaining number of uplink HARQ retransmissions is maintained until the carrier switching from the secondary carrier to the primary carrier is performed.

Furthermore, it is characterized in that the uplink HARQ retransmission process being performed is terminated when performing the carrier switching from the primary carrier to the secondary carrier in case where the remaining number of uplink HARQ retransmissions is not maintained until the carrier switching from the secondary carrier to the primary carrier is performed.

Furthermore, it is characterized in that the uplink HARQ retransmission process being performed is suspended when performing the carrier switching from the primary carrier to the secondary carrier in case where the remaining number of uplink HARQ retransmissions is maintained until the carrier switching from the secondary carrier to the primary carrier is performed.

Furthermore, it is characterized in that the method may further include restarting the suspended uplink HARQ retransmission process as many as the number of the remained uplink HARQ retransmissions when the carrier switching from the secondary carrier to the primary carrier is performed.

Furthermore, it is characterized in that the carrier switching from the secondary carrier to the primary carrier is performed when the reception of the E-MBS service on the secondary carrier is terminated.

Furthermore, it is characterized in that the method may further include receiving the E-MBS service on the secondary carrier from a base station.

Furthermore, according to the present disclosure, there is provided a terminal for receiving E-MBS service by performing a carrier switching operation in a multi-carrier system, the terminal comprising: a transmission unit configured to transmit wireless signals to the outside; a receiving unit configured to receive wireless signals from the outside; and a controller configured to terminate or suspend(or stop) performing uplink HARQ retransmission process when carrier switching from primary carrier to secondary carrier is performed.

Furthermore, it is characterized in that the controller may control to terminate the uplink HARQ retransmission process when performing the carrier switching from the primary carrier to the secondary carrier even if uplink HARQ bursts corresponding to the uplink HARQ retransmission are not transmitted up to the maximum number of transmissions or not successfully decoded.

Furthermore, it is characterized in that the controller may control to check the number of uplink HARQ retransmissions being performed when performing the carrier switching, and then calculate the remaining number of uplink HARQ retransmissions, and check whether the remaining number of uplink HARQ retransmissions is maintained until the carrier switching from the secondary carrier to the primary carrier is performed.

Furthermore, it is characterized in that the controller may control to terminate the uplink HARQ retransmission process being performed when performing the carrier switching from the primary carrier to the secondary carrier in case where the remaining number of uplink HARQ retransmissions is not maintained until the carrier switching from the secondary carrier to the primary carrier is performed.

Furthermore, it is characterized in that the controller may control to suspend the uplink HARQ retransmission process being performed when performing the carrier switching from the primary carrier to the secondary carrier in case where the remaining number of uplink HARQ retransmissions is maintained until the carrier switching from the secondary carrier to the primary carrier is performed.

Furthermore, it is characterized in that the controller may control to restart the suspended(or stopped) uplink HARQ retransmission process as many as the number of the remained uplink HARQ retransmissions when the carrier switching from the secondary carrier to the primary carrier is performed.

According to the present disclosure, when a terminal performing a carrier switching operation performs carrier switching from a primary carrier to a secondary carrier, an uplink HARQ retransmission process currently being performed is terminated or suspended, thereby having the effect of securing QoS for allowing the terminal to receive an E-MBS service.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Figure 1:
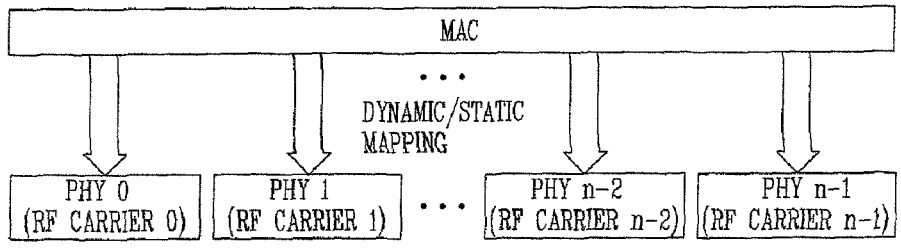
FIGS. 1A and 1B are views for describing a multi-band radio frequency (RF)-based signal transmission and reception method.
Figure 1:
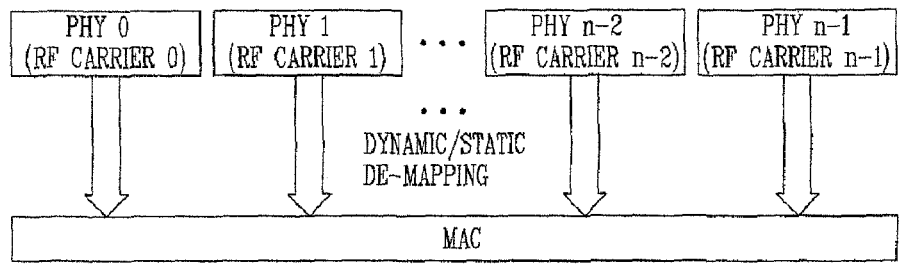
Figure 2:
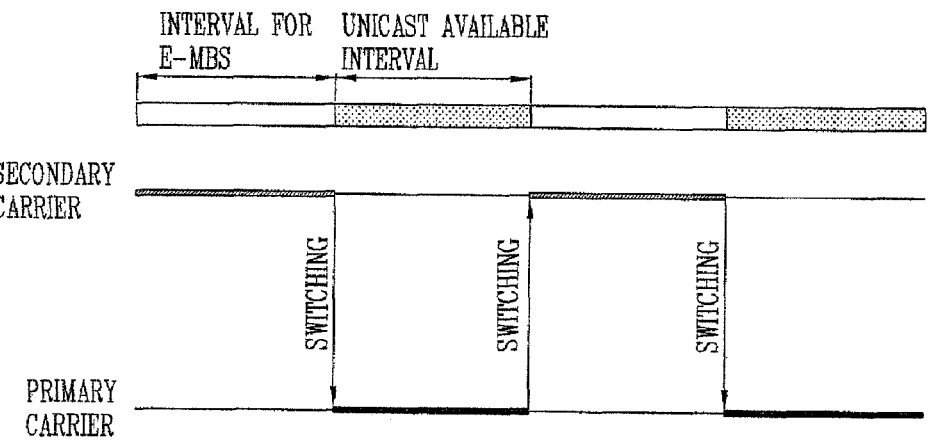
FIG. 2 is a view illustrating a method of performing a carrier switching operation for allowing the terminal to receive an E-MBS service when the terminal's carrier switching mode is activated in a multi-carrier system.

Hereinafter, embodiments according to the present disclosure will be described in detail with reference to the accompanying drawings. In the following description, it should be noted that only a portion required to understand the operation according to the present disclosure will be described, and the description of the remaining portion will be omitted not to obscure the gist of the present disclosure.

In the following embodiments, the constituent elements and features of the present disclosure are combined with one another in a predetermined form. Each constituent element or feature thereof should be considered to be selective as unless otherwise particularly specified. Each constituent element or feature thereof may be implemented in the form of not being combined with any other constituent elements or features. Furthermore, an embodiment of the present disclosure may be also configured by combining some of the constituent elements and/or features. The sequence of the operations described in the embodiments of the present disclosure may be changed. Some of the configurations or features of any embodiment may be included in any other embodiments, or may be replaced with the configurations and features corresponding to the any other embodiments.

Embodiments of the present disclosure are described mainly in relation to the transmission and reception of data between a base station and a terminal. Here, the base station has also the meaning of a terminal node of a network, which directly performs communication with the terminal. In this disclosure, a specific operation described to be performed by a base station may be carried out by an upper node of the base station if necessary.

In other words, it should be understood that various operations carried out for communication with a terminal in a network comprised of a plurality of network nodes including a base station can be carried out by the base station or other network nodes except the base station. The term "base station" may be replaced by a term such as fixed station, Node B, eNode B (eNB), access point, or the like. Furthermore, the term "terminal" may be replaced by a term such as UE (user equipment), MS (mobile station), MSS (mobile subscriber station), or the like.

Embodiments of the present disclosure may be implemented through various means. For example, embodiments of the present disclosure may be implemented by hardware, firmware, software, or any combination thereof.

In case of a hardware implementation, a method according to the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In case of a firmware or software implementation, a method according to the embodiments of the present disclosure may be implemented in the form of a module, procedure, function, or the like, which performs the functions or operations as described above. The software codes may be stored in a memory unit to be driven by a processor. The memory unit may be located at an inner or outer portion of the processor to send and/or receive data to and/or from the processor by various publicly-known means.

Specific terms used herein are provided to help understanding of the present disclosure, and the use of those specific terms may be replaced with other terms without departing from the technical spirit of the present disclosure.

According to the present disclosure, there is provided a method of performing a HARQ retransmission process for uplink unicast services in a terminal being operated in a carrier switching mode.

Here, the carrier switching mode refers to a process of allowing the terminal to perform a carrier switching operation between a primary carrier and a secondary carrier to receive an E-MBS service.

First Embodiment

According to a first embodiment of the present disclosure, there is provided a method of terminating an uplink (UL) HARQ(Hybrid Automatic Request Repeat) process currently being performed in a unicast available interval when the unicast available interval is terminated.

Figure 3:
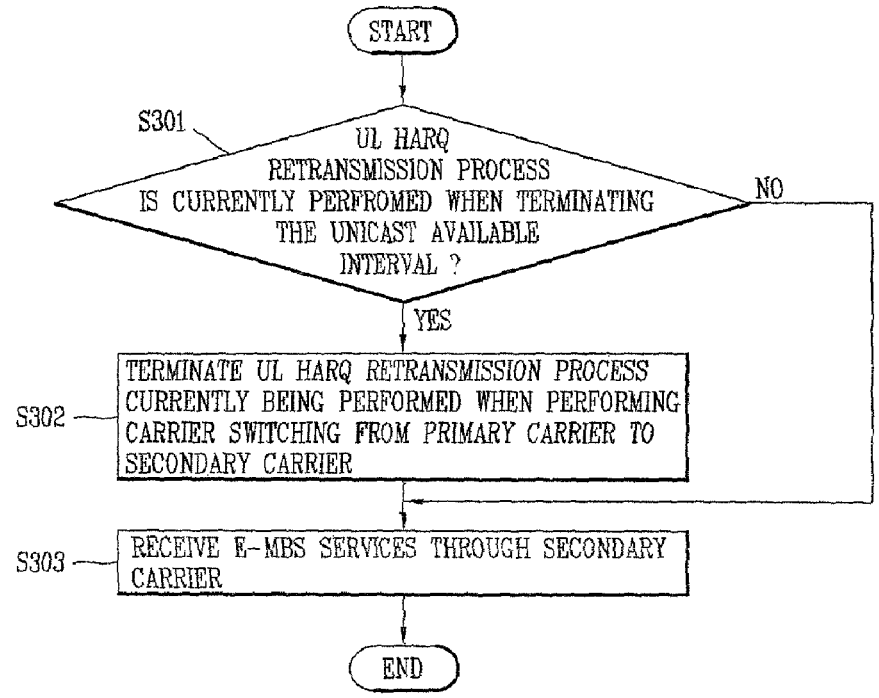
FIG. 3 is a flow chart illustrating the operation of a terminal according to a first embodiment of the present disclosure.

FIG. 3 is a flow chart illustrating the operation of a terminal according to a first embodiment of the present disclosure.

First, the terminal receives an E-MBS service on a secondary carrier during the E-MBS service interval, and may receive a unicast service on a primary carrier during the unicast available interval.

The terminal performs a carrier switching operation from a primary carrier to a secondary carrier when the unicast available interval is terminated, and performs a carrier switching operation from a secondary carrier to a primary carrier when the E-MBS service interval is terminated.

When a determined unicast available interval is terminated, the terminal checks whether there is an uplink hybrid automatic repeat request (HARQ) retransmission process currently being performed at the time of the termination (S301).

If there is an uplink (HARQ) retransmission process currently being performed when terminating the unicast available interval, then the terminal terminates the uplink HARQ retransmission process currently being performed when the unicast available interval is terminated (S302). In other words, the terminal terminates the uplink HARQ retransmission process being performed during the unicast available interval in accordance with a timing of terminating the unicast available interval.

Here, the terminal terminates a process of retransmitting uplink HARQ bursts when the unicast available interval is terminated even if uplink HARQ bursts corresponding to the uplink HARQ retransmission process are not transmitted as many as the maximum number of transmissions or not successfully decoded until the unicast available interval is terminated.

In other words, when performing carrier switching from a primary carrier to a secondary carrier to receive an E-MBS service, the terminal terminates an uplink HARQ retransmission process currently being progressed.

Next, the terminal receives an E-MBS service on a secondary carrier during the E-MBS service interval (S303).

If the carrier switching mode is activated, then the terminal repetitively performs the foregoing process during the determined unicast available interval and E-MBS service interval.

Figure 4:
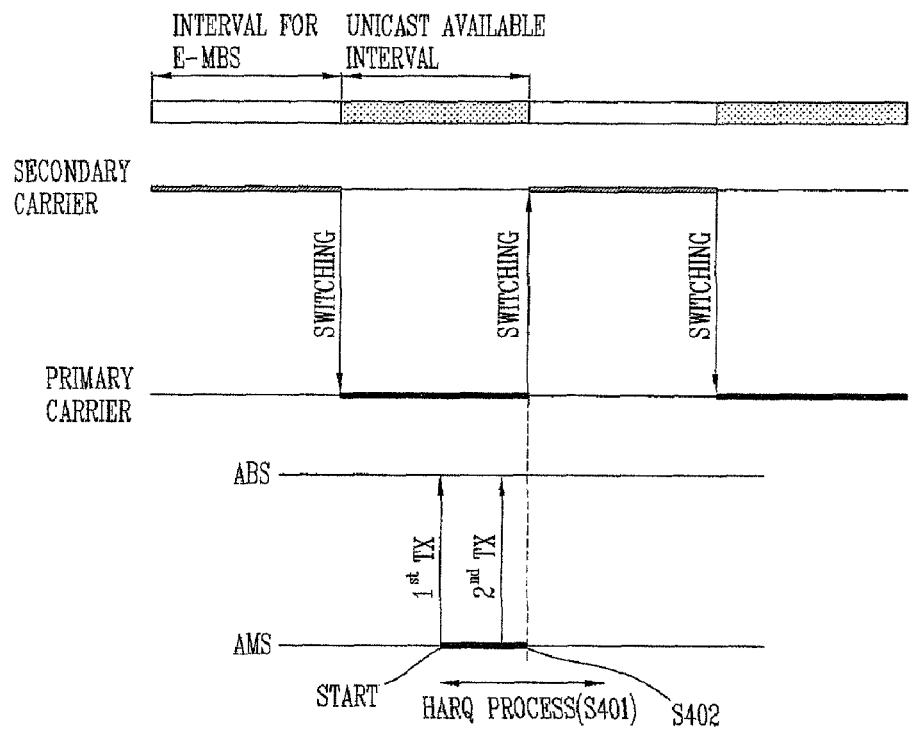
FIG. 4 is a view illustrating the uplink HARQ retransmission operation of a terminal performing a carrier switching operation according to a first embodiment of the present disclosure.

FIG. 4 is a view illustrating the uplink HARQ retransmission operation of a terminal performing a carrier switching operation according to a first embodiment of the present disclosure.

Referring to FIG. 4, the terminal performs a HARQ retransmission process to uplink data in a unicast available interval. It is assumed that the maximum number of HARQ retransmissions to the uplink data is 4.

In other words, the uplink HARQ retransmission process having the maximum number of HARQ retransmissions, which is 4, is started and performed during the unicast available interval (S401).

If the number of uplink HARQ retransmissions being performed is 2 when terminating the unicast available interval, the terminal terminates the uplink HARQ retransmission process even if the retransmission process is not performed as many as the maximum number of HARQ retransmissions, which is 4 (S402).

In other words, the terminal terminates an uplink HARQ retransmission process being performed even if the uplink HARQ retransmission process currently being performed is not successfully decoded or not transmitted up to the maximum number of transmissions when the unicast available interval is terminated (when carrier switching is performed from a primary carrier to a secondary carrier).

Next, the terminal performs carrier switching to a secondary carrier to receive a E-MBS service from the base station.

In other words, FIG. 4 illustrates a case where the terminal performing a carrier switching operation terminates an uplink HARQ retransmission process in accordance with the unicast available interval, and then performs carrier switching from a primary carrier to a secondary carrier, and then receives an E-MBS service from the base station.

Second Embodiment

According to a second embodiment of the present disclosure, there is provided a method of suspending or terminating uplink HARQ processes when terminating the first unicast available interval according to whether the uplink HARQ processes to a unicast service currently being progressed during the first unicast available interval are maintained up to the second unicast available interval.

Figure 5:
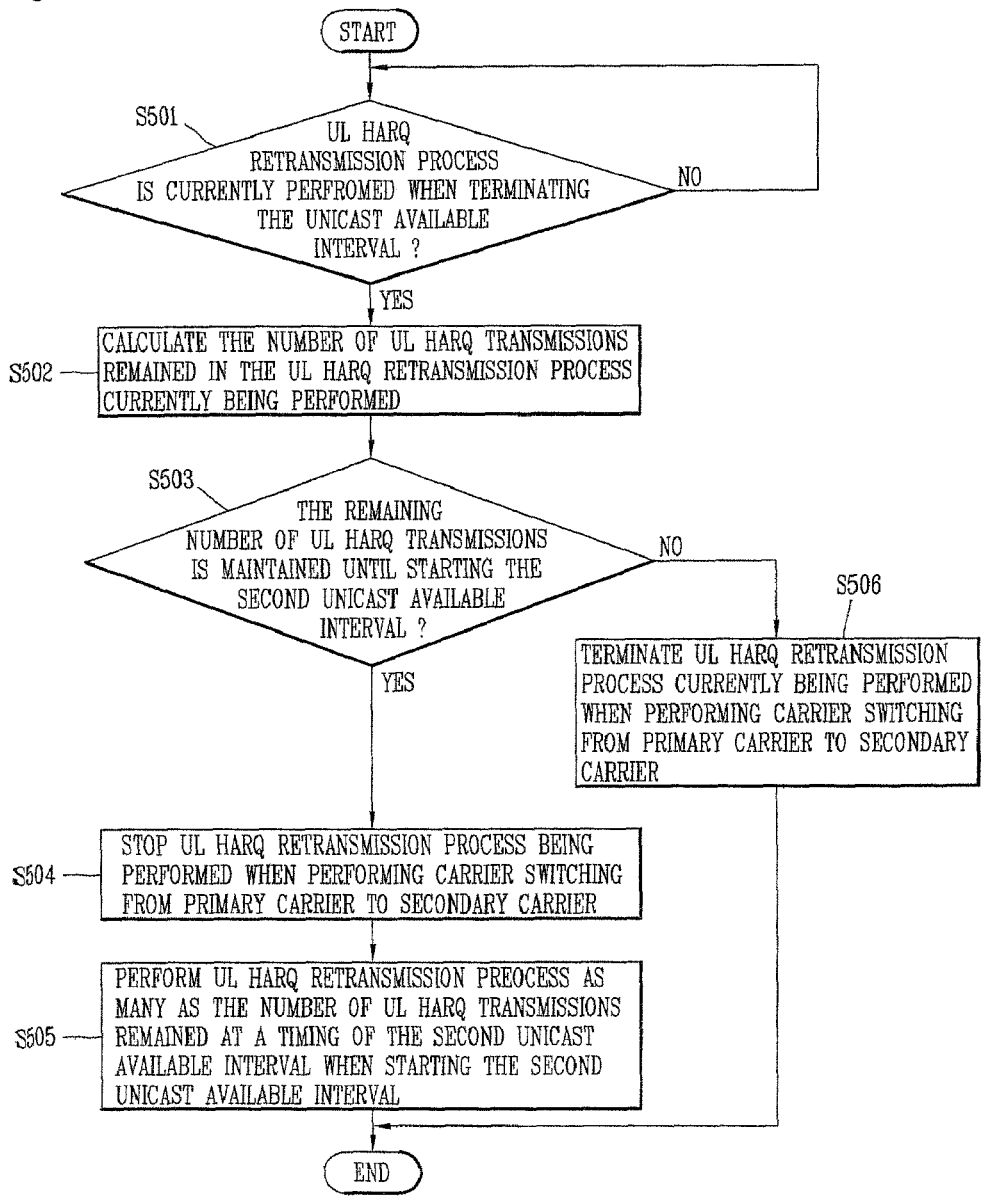
FIG. 5 is a flow chart illustrating the operation of a terminal according to a second embodiment of the present disclosure.

FIG. 5 is a flow chart illustrating the operation of a terminal according to a second embodiment of the present disclosure.

The terminal checks whether there is an uplink HARQ retransmission process currently being progressed before terminating the first unicast available interval, in other words, prior to performing carrier switching from a primary carrier to a secondary carrier (S501).

As a result of the check, if there is an uplink HARQ retransmission process currently being progressed, then the terminal checks the number of HARQ transmissions to the uplink HARQ retransmission currently being progressed, and then calculates the number of HARQ transmissions remained until the maximum number of transmissions (S502).

The terminal checks whether the remaining number of HARQ transmissions is maintained from a timing of terminating the first unicast available interval to a timing of starting the second unicast available interval (S503).

Here, the second unicast available interval refers to a unicast available interval arrived subsequent to (or immediately subsequent to) the first unicast available interval.

Furthermore, the interval from a timing of terminating the first unicast available interval to a timing of starting the second unicast available interval refers to an interval in which the terminal performs carrier switching from a primary carrier to a secondary carrier and then performs again carrier switching from the secondary carrier to the primary carrier.

If the uplink HARQ retransmission process progressed in the first unicast available interval is maintained without exceeding the maximum number of HARQ transmissions until the second unicast available interval is started, then the terminal suspend(or stop)s the uplink HARQ retransmission process when terminating the first unicast available interval (in case of performing carrier switching from a primary carrier to a secondary carrier) (S504).

Subsequently, the terminal performs carrier switching from a primary carrier to a secondary carrier to receive an E-MBS service through the secondary carrier. Here, the terminal skips the uplink HARQ retransmission process during an interval of receiving the E-MBS service. In other words, the terminal does not perform as many as the number of uplink HARQ retransmissions corresponding to the E-MBS service interval.

Next, the terminal performs again the uplink HARQ retransmission process suspended in the second unicast available interval as many as the remaining number of transmissions (S505).

Here, the remaining number of transmissions does not refer to the number of HARQ transmissions remained at the time of terminating the first unicast available interval but to the number of HARQ transmissions remained at the time of starting the second unicast available interval.

For example, in case where the maximum number of uplink HARQ retransmissions currently being performed during the first unicast available interval is 8, and the number of uplink HARQ retransmissions is 2 when terminating the first unicast available interval, and the number of transmissions corresponding to the uplink HARQ retransmissions at the time of starting the second unicast available interval is 7, the terminal performs the remaining two uplink HARQ retransmission processes when starting the second unicast available interval.

Furthermore, in case where an uplink HARQ retransmission process started and performed during the first unicast available interval at the step of S503 exceeds the maximum number of HARQ transmissions until the second unicast available interval is started, in other words, in case where the uplink HARQ retransmission process is not maintained until the second unicast available interval, the terminal terminates the uplink HARQ retransmission process when terminating the first unicast available interval (when performing carrier switching from a primary carrier to a secondary carrier) (S506).

Subsequently, the terminal receives an E-MBS service through a secondary carrier during the E-MBS service interval.

When UL HARQ Process Is Suspended And Then Restarted

Figure 6:
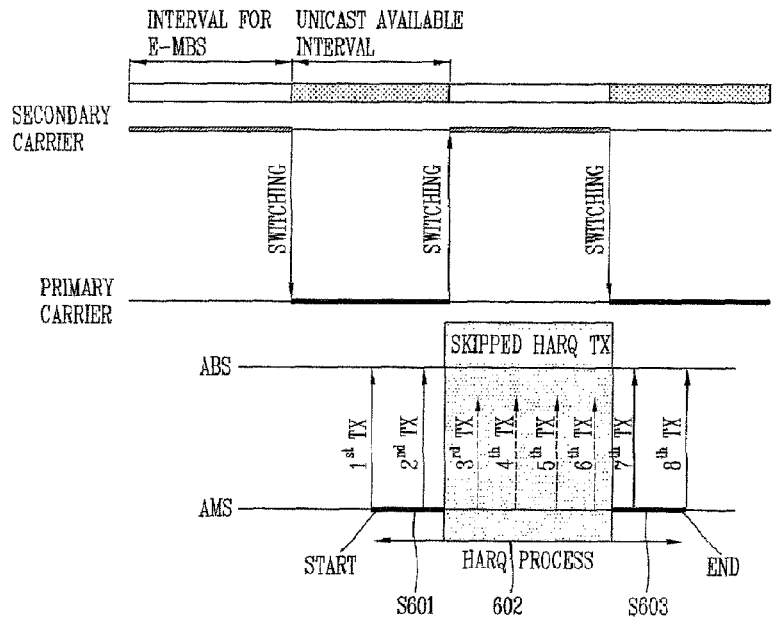
FIG. 6 is a view illustrating a method of suspending an uplink (UL) HARQ process according to a second embodiment of the present disclosure when the first unicast available interval is terminated, and performing again the process when the second unicast available interval is started.

FIG. 6 is a view illustrating a method of suspending an uplink (UL) HARQ process according to a second embodiment of the present disclosure when the first unicast available interval is terminated, and performing again the process when the second unicast available interval is started.

Referring to FIG. 6, it is seen that the maximum number of transmissions in the uplink HARQ retransmission process currently being progressed during the first unicast available interval is 8, and the maximum number of transmissions is maintained until the second unicast available interval is started.

In this case, the terminal suspends the uplink HARQ retransmission process being progressed when the first unicast available interval is terminated (the number of UL HARQ retransmissions is 2 when terminating the first unicast available interval) (S601), and skips the third to the sixth transmissions of the uplink HARQ retransmission process during the E-MBS service interval (S602).

Subsequently, the terminal performs the seventh and the eighth transmissions of the remaining uplink HARQ retransmission process when the second unicast available interval is started (S603).

When UL HARQ Process Is Terminated

Figure 7:
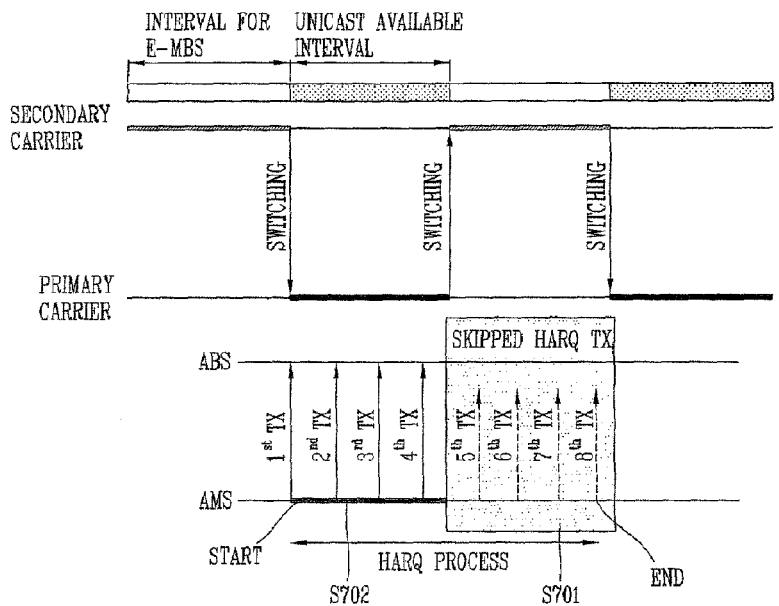
FIG. 7 is a view illustrating a method of terminating an uplink (UL) HARQ process according to a second embodiment of the present disclosure when the first unicast available interval is terminated.

FIG. 7 is a view illustrating a method of terminating an uplink (UL) HARQ process according to a second embodiment of the present disclosure when the first unicast available interval is terminated.

Referring to FIG. 7, it is seen that the maximum number of transmissions in an uplink HARQ retransmission process currently being progressed during the first unicast available interval is 8, and the maximum number of transmissions is not maintained until the second unicast available interval is started.

In other words, as illustrated in FIG. 7, the first to fourth HARQ transmissions have been carried out until terminating the first unicast available interval, and the remaining fifth to eighth UL HARQ transmissions are not maintained until starting the second unicast available interval (S701), and thus the terminal terminates an uplink HARQ retransmission process currently being performed at the time of terminating the first unicast available interval (S702).

Figure 8:
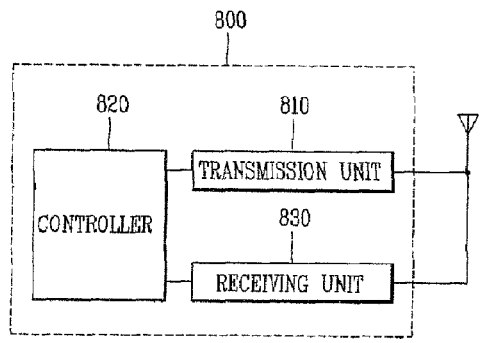
FIG. 8 is an internal block diagram according to a first embodiment of the present disclosure.

FIG. 8 is an internal block diagram according to a first embodiment of the present disclosure.

First, a terminal 800 may include a transmission unit 810, a controller 820, and a receiving unit 830.

Furthermore, the terminal 800 performs a carrier switching operation between a primary carrier and a secondary carrier to receive a multicast and broadcast service(E-MBS service) in a multi-carrier system.

In other words, the terminal 800 may receive unicast scheduling from a base station on a primary carrier to transmit and/or receive a unicast service to and/or from the base station during the unicast available interval. The unicast available interval may be provided from the base station. The terminal may transmit uplink data to the base station during the unicast available interval, and may perform a HARQ retransmission process to the uplink data.

Furthermore, the terminal 800 may receive an E-MBS service from the base station on a secondary carrier during the E-MBS service interval.

The transmission unit 810 performs an uplink HARQ retransmission process during the first unicast available interval.

The controller 820 checks whether the uplink HARQ retransmission process is carried out when the first unicast available interval is terminated. As a result of the check, if the uplink HARQ retransmission process is carried out, then the controller controls to terminate or suspend the uplink HARQ retransmission process being performed when performing candidate word from a primary carrier to a secondary carrier.

In other words, the controller 820 controls to terminate the uplink HARQ retransmission process when performing the carrier switching from a primary carrier to a secondary carrier even if uplink HARQ bursts corresponding to the uplink HARQ retransmission are not transmitted up to the maximum number of transmissions or not successfully decoded.

Furthermore, the controller 820 controls to check the number of uplink HARQ retransmissions being performed when terminating the first unicast available interval, and then calculate the remaining number of uplink HARQ retransmissions. Subsequently, the controller 820 checks whether the remaining number of uplink HARQ retransmissions is maintained until the second unicast available interval is started.

Here, the controller 820 controls to terminate the uplink HARQ retransmission process being performed when performing the carrier switching from a primary carrier to a secondary carrier in case where the remaining number of uplink HARQ retransmissions is not maintained until the second unicast available interval is started.

Here, the second unicast available interval refers to a unicast available interval subsequent to the first unicast available interval. Particularly, subsequent to the first unicast available interval may be a unicast available interval corresponding to immediately subsequent to the first unicast available interval.

However, the controller 820 controls to suspend the uplink HARQ retransmission process being performed when performing carrier switching from a primary carrier to a secondary carrier in case where the remaining number of uplink HARQ retransmissions is maintained until the second unicast available interval is started.

Furthermore, the controller 820 controls to restart the suspended uplink HARQ retransmission process as many as the number of uplink HARQ retransmissions remained at the timing of starting the second unicast available interval when the second unicast available interval is started.

The receiving unit 830 receives a multicast and broadcast service through the secondary carrier during the multicast and broadcast service interval.

Here, the receiving unit 830 does not receive a unicast service through the primary carrier during the multicast and broadcast service interval.

The invention claimed is:

1. A method for performing a carrier switching operation by a terminal to receive enhanced multicast broadcast service (E-MBS) service in a multi-carrier system, the method comprising:
   checking, by the terminal, whether an uplink hybrid automatic repeat request (HARQ) retransmission process is being performed when a first unicast available interval is terminated;
   when the uplink HARQ retransmission process is being performed, checking, by the terminal, a remaining number of uplink HARQ retransmissions up to a maximum number of uplink HARQ retransmissions for the uplink HARQ retransmission process;
   checking, by the terminal, whether the remaining number of uplink HARQ retransmissions is maintained from a timing of terminating the first unicast available interval to a timing of starting a second unicast available interval;
   performing, by the terminal, carrier switching from a primary carrier to a secondary carrier, wherein the uplink HARQ retransmission process is suspended when the remaining number of uplink HARQ retransmissions is maintained, and wherein the uplink HARQ retransmission process is terminated when the remaining number of uplink HARQ retransmissions is not maintained;
   receiving, by the terminal, E-MBS data transmitted on the secondary carrier; and
   performing, by the terminal, carrier switching from the secondary carrier to the primary carrier after receiving the E-MBS data on the secondary carrier,
   wherein, when the remaining number of uplink HARQ retransmissions is not maintained until carrier switching from the secondary carrier to the primary carrier, the uplink HARQ retransmission process is terminated after carrier switching from the secondary carrier to the primary carrier, and
   wherein, when the remaining number of uplink HARQ retransmissions is maintained until carrier switching from the secondary carrier to the primary carrier, the uplink HARQ retransmission process is resumed after carrier switching from the secondary carrier to the primary carrier.

2. The method of claim 1, further comprising:
   staying, by the terminal, in the primary carrier until starting carrier switching operation again when the E-MBS service on the secondary carrier is terminated.

3. A terminal for performing a carrier switching operation to receive enhanced multicast broadcast service (E-MBS) service in a multi-carrier system, the terminal comprising:
   a receiving unit; and
   a controller configured to:
      check whether there is an uplink hybrid automatic repeat request (HARQ) retransmission process being performed when a first unicast available interval is terminated,
      when the uplink HARQ retransmission process is being performed, check a remaining number of uplink HARQ retransmissions up to a maximum number of uplink HARQ retransmissions for the uplink HARQ retransmission process,
      check whether the remaining number of uplink HARQ retransmissions is maintained from a timing of terminating the first unicast available interval to a timing of starting a second unicast available interval,
      perform carrier switching from a primary carrier to a secondary carrier, wherein the uplink HARQ retransmission process is suspended when the remaining number of uplink HARQ retransmissions is maintained, and wherein the uplink HARQ retransmission process is terminated when the remaining number of uplink HARQ retransmissions is not maintained,
      receive E-MBS data transmitted on the secondary carrier through the receiving unit, and
      perform carrier switching from the secondary carrier to the primary carrier after receiving the E-MBS data on the secondary carrier,
   wherein, when the remaining number of uplink HARQ retransmissions is not maintained until carrier switching from the secondary carrier to the primary carrier, the uplink HARQ retransmission process is terminated after carrier switching from the secondary carrier to the primary carrier, and
   wherein, when the remaining number of uplink HARQ retransmissions is maintained until carrier switching from the secondary carrier to the primary carrier, the uplink HARQ retransmission process is resumed after carrier switching from the secondary carrier to the primary carrier.

4. The terminal of claim 3, wherein the controller is further configured to stay in the primary carrier until starting carrier switching operation again when the E-MBS service on the secondary carrier is terminated.

* * * * *